US012635039B2

(12) United States Patent
Bendlin et al.

(10) Patent No.: US 12,635,039 B2
(45) Date of Patent: *May 19, 2026

(54) CLOSED LOOP CARRIER SENSE MULTIPLE ACCESS WITH MULTIUSER REQUEST TO SEND AND CLEAR TO SEND HANDSHAKING IN AN ADVANCED WIRELESS NETWORK

(71) Applicant: AT&T Intellectual Property I, L.P., Atlanta, GA (US)

(72) Inventors: Ralf Bendlin, Cedar Park, TX (US); Thomas Novlan, Jonestown, TX (US); Arunabha Ghosh, Austin, TX (US); Abdulrauf Hafeez, Cary, NC (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 36 days.

This patent is subject to a terminal disclaimer.

(21) Appl. No.: 18/670,100

(22) Filed: May 21, 2024

(65) Prior Publication Data
US 2024/0306258 A1      Sep. 12, 2024

Related U.S. Application Data

(63) Continuation of application No. 17/993,244, filed on Nov. 23, 2022, now Pat. No. 12,028,939, which is a
(Continued)

(51) Int. Cl.
*H04W 88/06* (2009.01)
*H04B 7/0452* (2017.01)
(Continued)

(52) U.S. Cl.
CPC ........... *H04W 88/06* (2013.01); *H04W 16/14* (2013.01); *H04W 72/23* (2023.01); *H04W 74/0816* (2013.01); *H04B 7/0452* (2013.01)

(58) Field of Classification Search
CPC ............ H04B 7/0452; H04W 74/0816; H04W 16/14; H04W 88/06; H04W 72/23
(Continued)

(56) References Cited

U.S. PATENT DOCUMENTS 7,995,604 B2    8/2011   Rofougaran
8,274,961 B2    9/2012   Sakoda et al.
(Continued)

FOREIGN PATENT DOCUMENTS

GB        2549967 A       11/2017
WO     2015185989 A2      12/2015
(Continued)

OTHER PUBLICATIONS

Final Office Action received for U.S. Appl. No. 15/932,316 dated Aug. 2, 2019, 55 pages.
(Continued)

*Primary Examiner* — Peter G Solinsky
(74) *Attorney, Agent, or Firm* — Guntin & Gust, PLC; Dana B. LeMoine

(57) ABSTRACT

A closed loop carrier sense multiple access multiuser request to send and clear to send handshaking system is provided to efficiently allocate licensed and unlicensed spectrum for a plurality of mobile devices and across different base stations and mobile network operators. A user equipment device can be connected to a base station device via a first frequency in licensed spectrum, and a second frequency in unlicensed spectrum. The air interface on the first frequency can then be used to coordinate physical and virtual carrier sensing on a second frequency among a plurality of user equipment devices. Moreover, carrier sensing results from a plurality of UEs can be reported a base station device via the first frequency in licensed spectrum. The base station device can then schedule multiple user multiple input, multiple output
(Continued)

(MU-MIMO) transmissions to a plurality of UEs on the second frequency in unlicensed spectrum.

20 Claims, 10 Drawing Sheets

Related U.S. Application Data continuation of application No. 17/065,247, filed on Oct. 7, 2020, now Pat. No. 11,540,352, which is a continuation of application No. 16/138,132, filed on Sep. 21, 2018, now Pat. No. 10,834,781.

(51) Int. Cl.
*H04W 16/14* (2009.01)
*H04W 72/23* (2023.01)
*H04W 74/0816* (2024.01)

(58) Field of Classification Search
USPC .......................................................... 370/329
See application file for complete search history.

(56) References Cited

U.S. PATENT DOCUMENTS

| | | | |
|---|---|---|---|
| 8,428,041 B2 | 4/2013 | Sakoda et al. | |
| 8,472,467 B2 | 6/2013 | Oyman et al. | |
| 8,693,414 B2 | 4/2014 | Wu et al. | |
| 8,958,307 B2 | 2/2015 | Xue et al. | |
| 9,173,191 B2 | 10/2015 | Gong et al. | |
| 9,380,577 B2 | 6/2016 | Nezou et al. | |
| 9,730,105 B2 | 8/2017 | Bhushan et al. | |
| 9,980,289 B2 | 5/2018 | Wu et al. | |
| 10,645,590 B2 | 5/2020 | Yerramalli et al. | |
| 10,834,781 B2 | 11/2020 | Bendlin et al. | |
| 11,083,015 B2 | 8/2021 | Novlan et al. | |
| 11,540,352 B2 | 12/2022 | Bendlin et al. | |
| 12,028,939 B2 * | 7/2024 | Bendlin ................ | H04W 88/06 |
| 2014/0247774 A1 | 9/2014 | Zhou et al. | |
| 2014/0341018 A1 | 11/2014 | Bhushan et al. | |
| 2015/0296413 A1 | 10/2015 | Sadek et al. | |
| 2015/0312793 A1 | 10/2015 | Jeon et al. | |
| 2016/0066195 A1 | 3/2016 | Moon et al. | |
| 2016/0165574 A1 | 6/2016 | Chu et al. | |
| 2017/0135130 A1 | 5/2017 | Seok | |
| 2017/0142754 A1 | 5/2017 | Uziel et al. | |
| 2017/0223677 A1 | 8/2017 | Dinan et al. | |
| 2017/0223739 A1 | 8/2017 | Mallik et al. | |
| 2017/0332338 A1 | 11/2017 | Mallik et al. | |
| 2018/0020478 A1 | 1/2018 | Derham et al. | |
| 2018/0063799 A1 | 3/2018 | Sadek et al. | |
| 2018/0091980 A1 | 3/2018 | Sun et al. | |
| 2018/0115996 A1 | 4/2018 | Si et al. | |
| 2018/0220458 A1 | 8/2018 | Ouchi et al. | |
| 2018/0234980 A1 | 8/2018 | Li et al. | |
| 2018/0249380 A1 | 8/2018 | Zhang et al. | |
| 2019/0037482 A1 | 1/2019 | Damnjanovic et al. | |
| 2019/0150088 A1 | 5/2019 | Sun et al. | |
| 2019/0166621 A1 | 5/2019 | Yerramalli et al. | |
| 2019/0215140 A1 | 7/2019 | Hafeez et al. | |
| 2019/0335337 A1 | 10/2019 | Damnjanovic et al. | |
| 2020/0053599 A1 | 2/2020 | Damnjanovic et al. | |
| 2020/0145141 A1 | 5/2020 | Park et al. | |

FOREIGN PATENT DOCUMENTS

| | | | |
|---|---|---|---|
| WO | 2017050364 A1 | 3/2017 | |
| WO | 2017080572 A1 | 5/2017 | |
| WO | 2017114552 A1 | 7/2017 | |
| WO | 2017120542 A1 | 7/2017 | |
| WO | 2017136458 A2 | 8/2017 | |
| WO | 2017167746 A1 | 10/2017 | |
| WO | 2017172829 A1 | 10/2017 | |
| WO | 2017178486 A1 | 10/2017 | |
| WO | 2017196329 A1 | 11/2017 | |
| WO | 2017197296 A1 | 11/2017 | |
| WO | 2017212456 A1 | 12/2017 | |
| WO | 2018026410 A1 | 2/2018 | |
| WO | 2018028838 A1 | 2/2018 | |
| WO | 2018029654 A1 | 2/2018 | |
| WO | 2018029659 A1 | 2/2018 | |

OTHER PUBLICATIONS

Final Office Action received for U.S. Appl. No. 16/138,132 dated Jan. 30, 2020, 21 pages.
International Search Report and Written Opinion received for PCT Application Serial No. PCT/US2019/017306 dated Apr. 25, 2019, 18 pages.
Non Final office action received for U.S. Appl. No. 16/807,257 dated Nov. 13, 2020, 77 Pages.
Non Final office action received for U.S. Appl. No. 17/065,247 dated May 27, 2022, 31 Pages.
Non-Final Office Action received for U.S. Appl. No. 17/361,529 dated Sep. 16, 2022, 65 pages.
Non-Final Office Action received for U.S. Appl. No. 15/932,316 dated Feb. 21, 2019, 57 pages.
Non-Final Office Action received for U.S. Appl. No. 16/138,132 dated May 19, 2020, 21 pages.
Non-Final Office Action received for U.S. Appl. No. 16/138,132 dated Oct. 17, 2019, 34 pages.
Notice of Allowance received for U.S. Appl. No. 17/361,529 dated Jan. 11, 2023, 51 pages.
Chen , "Dynamic Spectrum Access in Cognitive Radio Networks: Optimization of Sensing-Transmission Scheme with Variable Packet Length." University of California, Davis, pp. 1-15 (2010), 15 pages.
Huang , et al., "Short paper: On Optimal Sensing and Transmission Strategies for Dynamic Spectrum Access." New Frontiers in Dynamic Spectrum Access Networks, DySPAN 2008, 3rd IEEE Symposium, IEEE, pp. 1-5 (2008). 5 pages.
Kim , et al., "Adaptive Listen-Before-Talk {LBT) Scheme for LTE and Wi-Fi Systems Coexisting in Unlicensed Band" Consumer Communications & Networking Conference {CCNC), 2016 13th IEEE Annual, IEEE, pp. 1-6 (2016). 6 pages.
Leu , et al., Modeling and analysis of interference in Listen-Before-Talk spectrum access schemes. International Journal of Network Management 16.2, pp. 131-147 (2006). 17 pages.
Liao , et al., "Full Duplex Cognitive Radio: A New Design Paradigm for Enhancing Spectrum Usage." IEEE Communications Magazine 53.5, pp. 138-145 (2015). 18 pages.
Liao , et al., "Listen-and-Talk: Full-Duplex Cognitive Radio Networks." Global Communications Conference Globecom), IEEE, pp. 1-6 (2014). 6 pages.
Sadek, et al., "Listen-Before-Talk Versus Treating Interference as Noise for Spectrum Sharing" New Frontiers in Dynamic Spectrum Access Networks, Dy SPAN 2008, 3rd IEEE Symposium, IEEE, pp. 1-6 (2008). 6 pages.
ZTE , "Channel sensing based scheme for CLI mitigation in NR", 3GPP TSG RAN WG1 Meeting #88bis, R1-1704435, 9.1.6.1, Apr. 3-7, 2017, pp. 1-7.
ZTE , "Channel sensing based scheme for cross-link interference mitigation in NR", 3GPP TSG RAN WG1 Meeting #88, R1-1701617, 8.1.6.3, Feb. 13-17, 2017, pp. 1-10.
ZTE , "Channel sensing based schemes for cross-link interference mitigation in NR", 3GPP TSG RAN WG1 Meeting #90, R1-1712282, 6.1.5.2, Aug. 21-25, 2017, pp. 1-8.

* cited by examiner

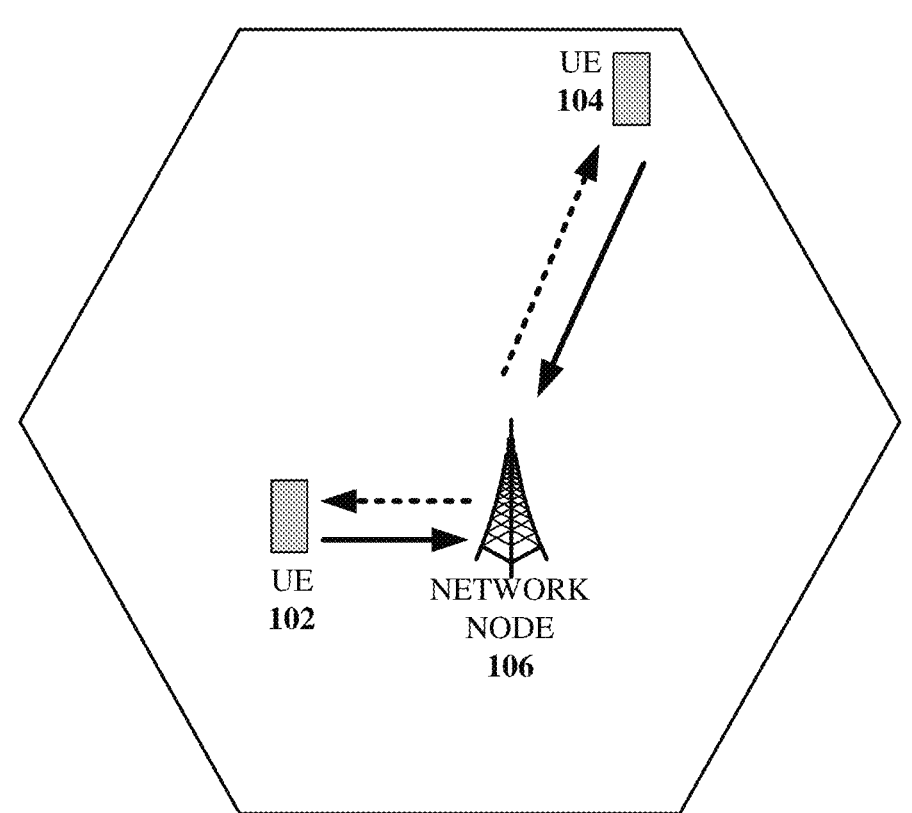
FIG. 1

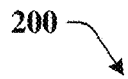
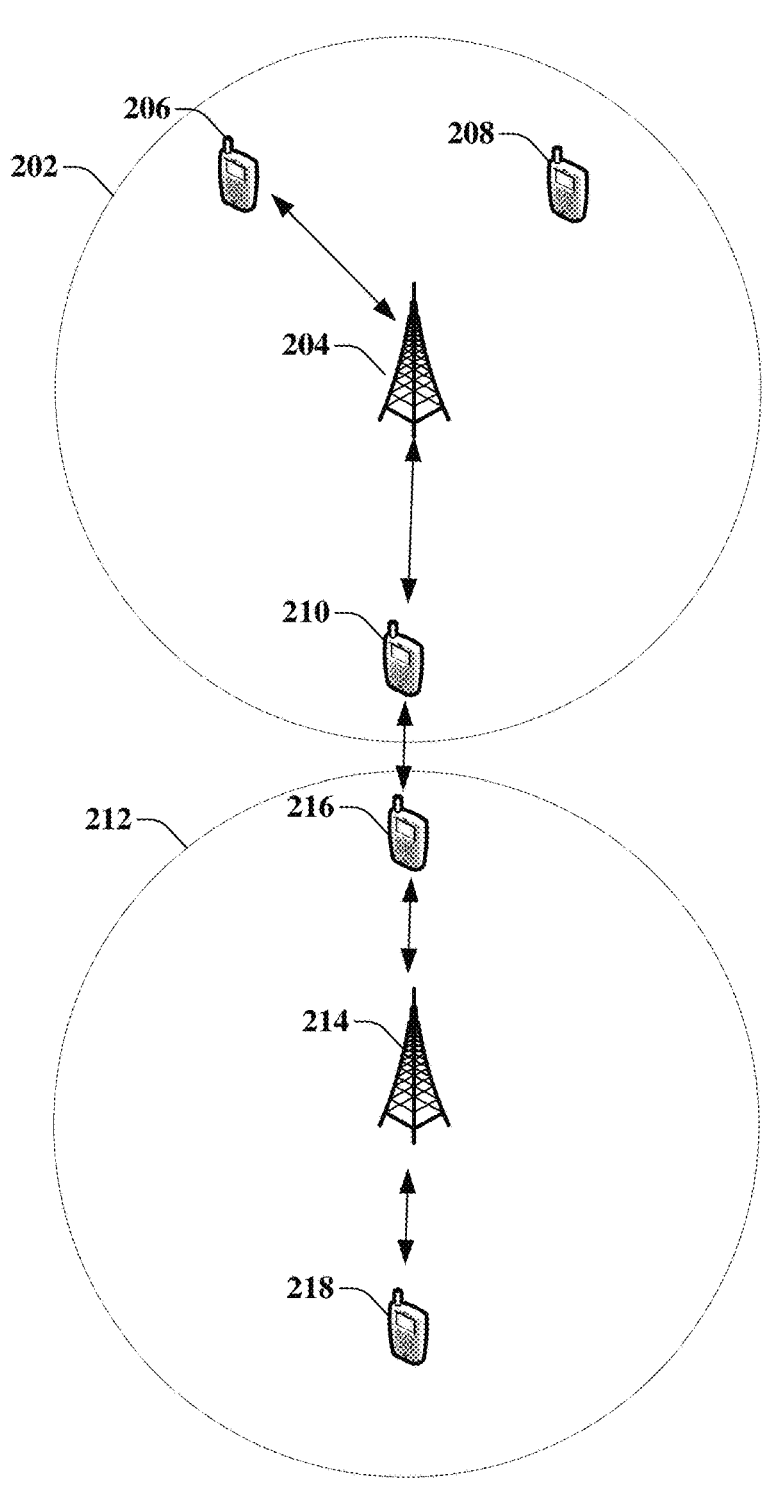
FIG. 2

300

204 — BASE STATION

210 — MOBILE DEVICE

216 — MOBILE DEVICE

306 — CONTROL CHANNEL TRANSMISSION ON FIRST FREQUENCY

308 — PERFORM CCA

310 — PERFORM CCA

312 — TRANSMIT WAVEFORM ON SECOND FREQUENCY

314 — REPORT RESULTS

TRANSMIT WAVEFORM ON SECOND FREQUENCY

TRANSMIT WAVEFORM ON SECOND FREQUENCY

316 —

318 — DETERMINE PARAMETERS

500

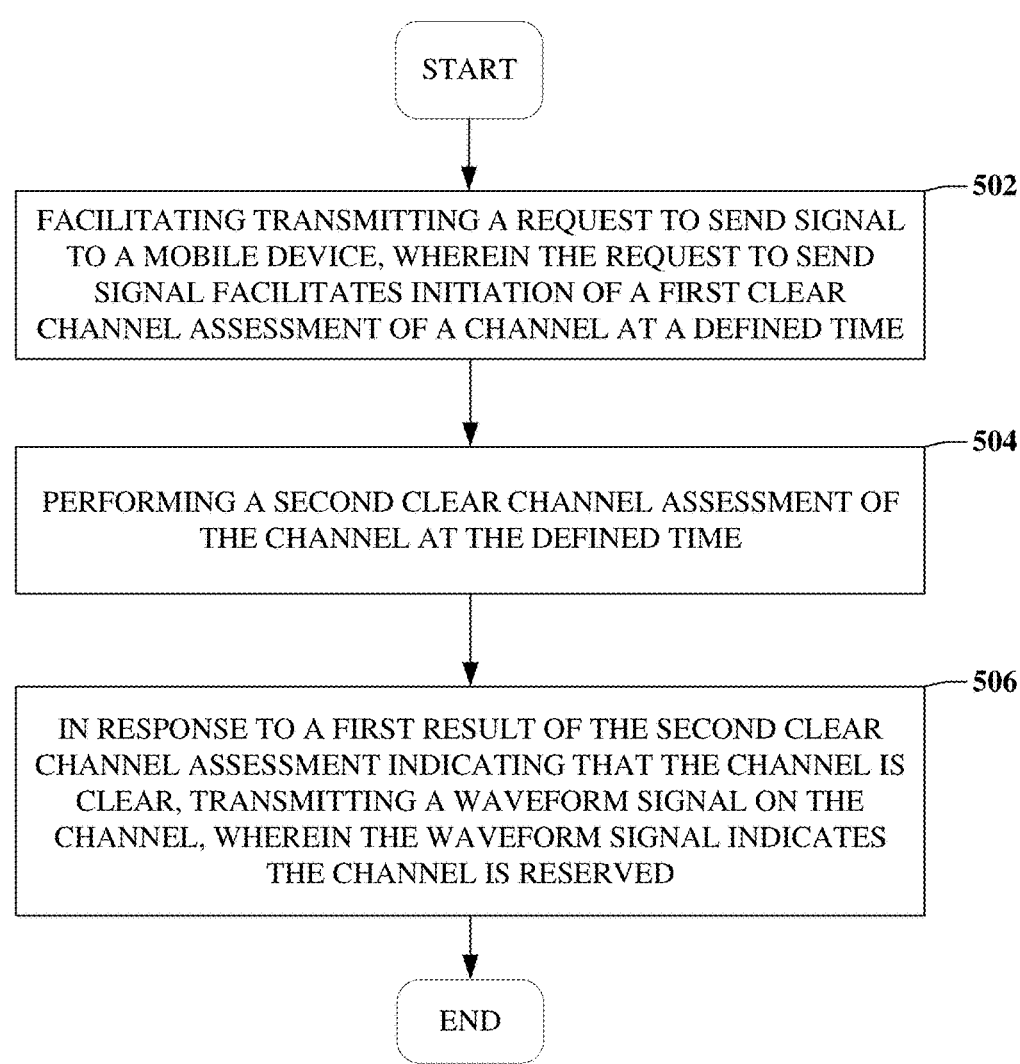

START

┌─────────────────────────────────────────────┐ ─502
│ FACILITATING TRANSMITTING A REQUEST TO SEND SIGNAL
│ TO A MOBILE DEVICE, WHEREIN THE REQUEST TO SEND
│ SIGNAL FACILITATES INITIATION OF A FIRST CLEAR
│ CHANNEL ASSESSMENT OF A CHANNEL AT A DEFINED TIME
└─────────────────────────────────────────────┘

┌─────────────────────────────────────────────┐ ─504
│ PERFORMING A SECOND CLEAR CHANNEL ASSESSMENT OF
│ THE CHANNEL AT THE DEFINED TIME
└─────────────────────────────────────────────┘

┌─────────────────────────────────────────────┐ ─506
│ IN RESPONSE TO A FIRST RESULT OF THE SECOND CLEAR
│ CHANNEL ASSESSMENT INDICATING THAT THE CHANNEL IS
│ CLEAR, TRANSMITTING A WAVEFORM SIGNAL ON THE
│ CHANNEL, WHEREIN THE WAVEFORM SIGNAL INDICATES
│ THE CHANNEL IS RESERVED
└─────────────────────────────────────────────┘

END

FIG. 5

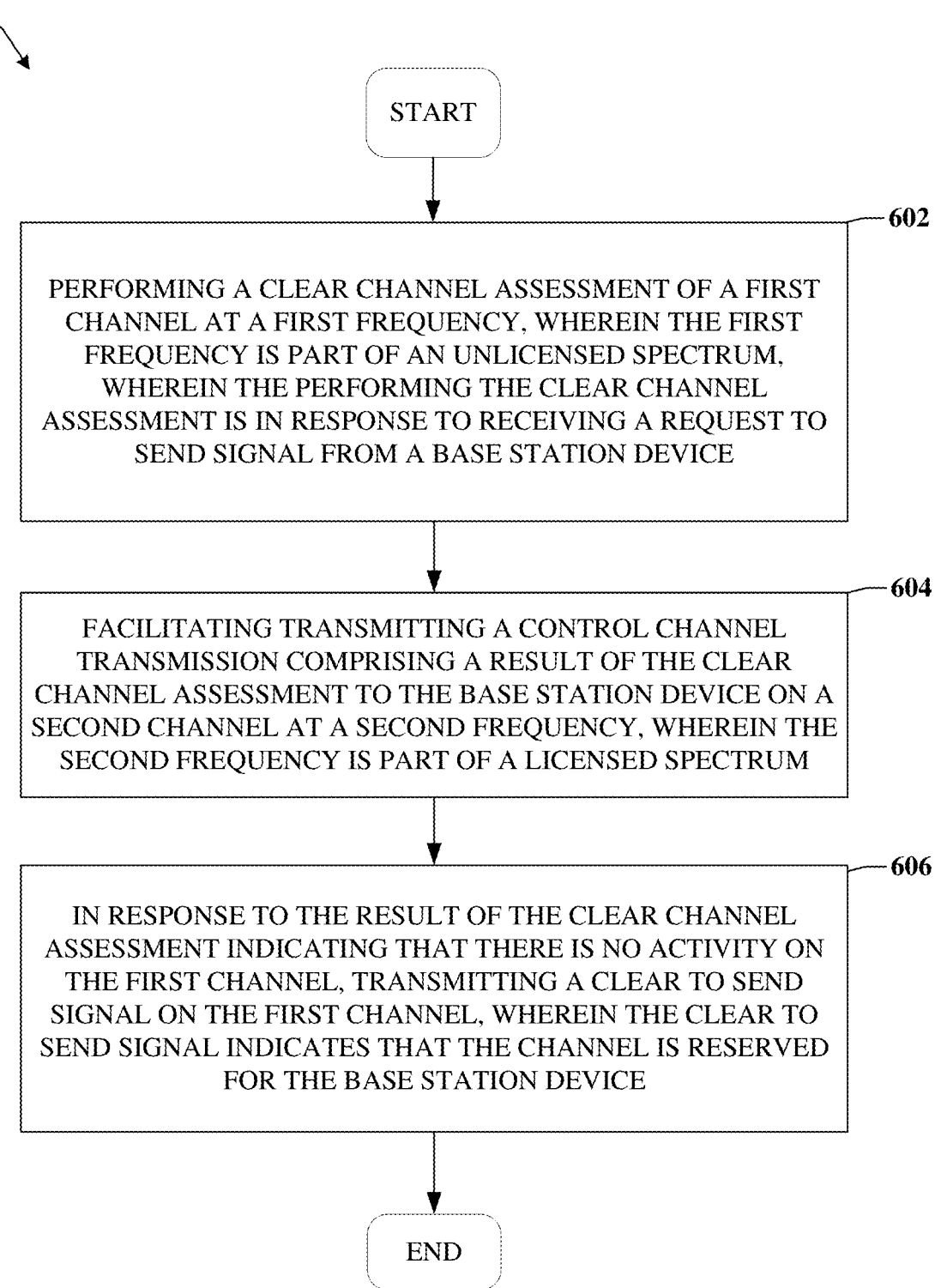

600

START

602

PERFORMING A CLEAR CHANNEL ASSESSMENT OF A FIRST CHANNEL AT A FIRST FREQUENCY, WHEREIN THE FIRST FREQUENCY IS PART OF AN UNLICENSED SPECTRUM, WHEREIN THE PERFORMING THE CLEAR CHANNEL ASSESSMENT IS IN RESPONSE TO RECEIVING A REQUEST TO SEND SIGNAL FROM A BASE STATION DEVICE

604

FACILITATING TRANSMITTING A CONTROL CHANNEL TRANSMISSION COMPRISING A RESULT OF THE CLEAR CHANNEL ASSESSMENT TO THE BASE STATION DEVICE ON A SECOND CHANNEL AT A SECOND FREQUENCY, WHEREIN THE SECOND FREQUENCY IS PART OF A LICENSED SPECTRUM

606

IN RESPONSE TO THE RESULT OF THE CLEAR CHANNEL ASSESSMENT INDICATING THAT THERE IS NO ACTIVITY ON THE FIRST CHANNEL, TRANSMITTING A CLEAR TO SEND SIGNAL ON THE FIRST CHANNEL, WHEREIN THE CLEAR TO SEND SIGNAL INDICATES THAT THE CHANNEL IS RESERVED FOR THE BASE STATION DEVICE

END

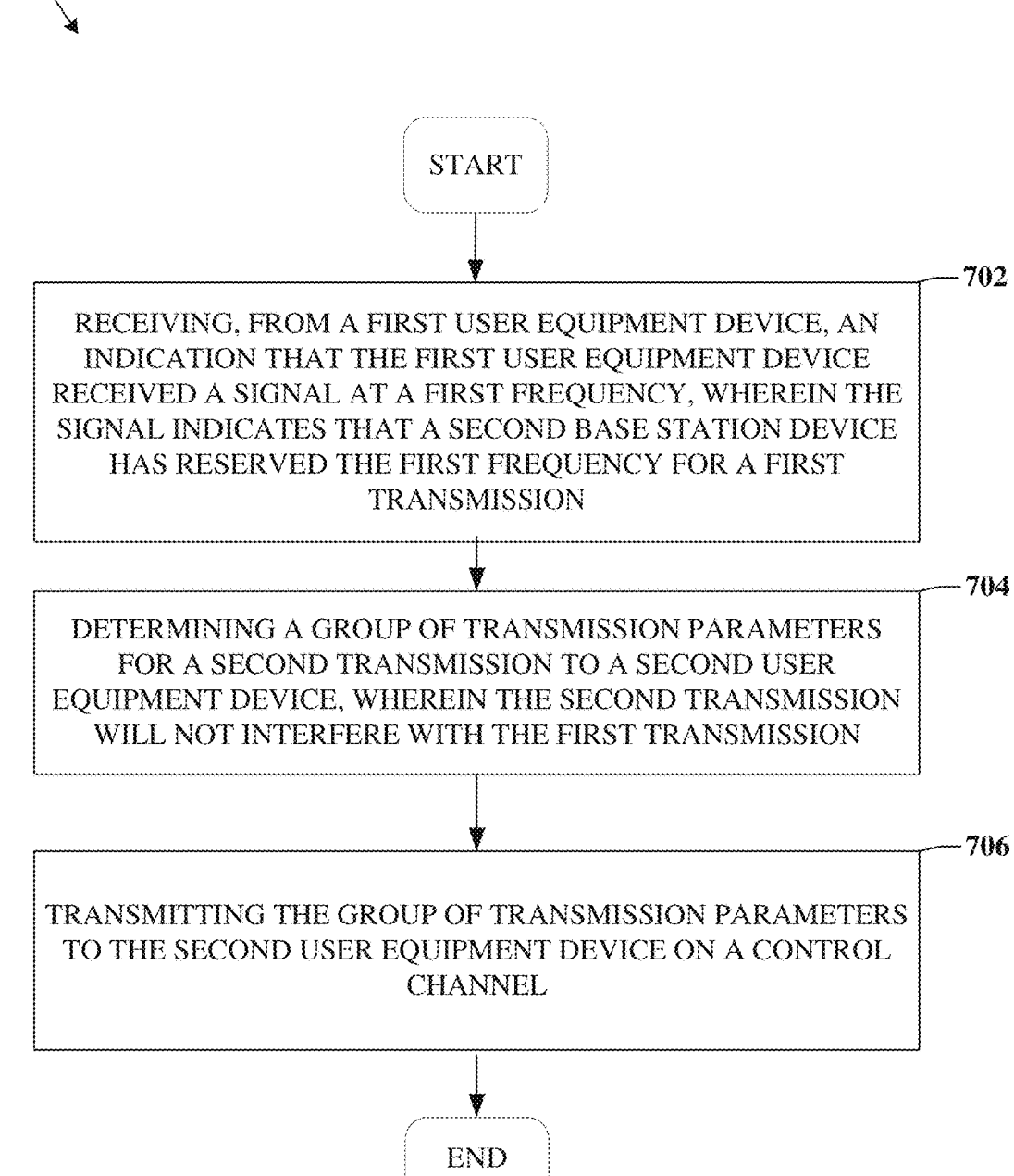

START

702

RECEIVING, FROM A FIRST USER EQUIPMENT DEVICE, AN INDICATION THAT THE FIRST USER EQUIPMENT DEVICE RECEIVED A SIGNAL AT A FIRST FREQUENCY, WHEREIN THE SIGNAL INDICATES THAT A SECOND BASE STATION DEVICE HAS RESERVED THE FIRST FREQUENCY FOR A FIRST TRANSMISSION

704

DETERMINING A GROUP OF TRANSMISSION PARAMETERS FOR A SECOND TRANSMISSION TO A SECOND USER EQUIPMENT DEVICE, WHEREIN THE SECOND TRANSMISSION WILL NOT INTERFERE WITH THE FIRST TRANSMISSION

706

TRANSMITTING THE GROUP OF TRANSMISSION PARAMETERS TO THE SECOND USER EQUIPMENT DEVICE ON A CONTROL CHANNEL

END

MOBILE NETWORK PLATFORM

CS GATEWAY NODE(S)
812

PS GATEWAY NODE(S)
818

SERVER(S)
814

SERVING NODE(S)
816

RAN

875

MEMORY

830

840

TELEPHONY NW(S)

WAN
850

SS7 NETWORK
860

ENTERPRISE NW(S)
870

SERVICE NW(S)
880

900

MOBILE HANDSET

APPLICATIONS — 906

CLIENT (STORE, DISCOVERY, PLAY) — 946

FIRMWARE — 908

TRIGGER COMPONENT — 938

VIDEO COMP — 930

HYSTERESIS COMPONENT — 936

DISPLAY — 912

SIP CLIENT — 940

SUBSCRIBER IDENTITY SYSTEM — 918 / 920

CAMERA — 922

COMMUNICATION COMPONENT — 910

CELL TCVR — 99

WIFI TCVR — 913

PROCESSOR — 902

SERIAL I/O INTERFACE — 914

MEMORY — 904

LOCATION COMPONENT — 932

USER INPUT — 935

AUDIO I/O — 916

POWER SOURCE — 924

POWER I/O — 926

CLOSED LOOP CARRIER SENSE MULTIPLE ACCESS WITH MULTIUSER REQUEST TO SEND AND CLEAR TO SEND HANDSHAKING IN AN ADVANCED WIRELESS NETWORK

RELATED APPLICATIONS

The subject patent application is a continuation of, and claims priority to each of, U.S. patent application Ser. No. 17/993,244, filed Nov. 23, 2022, which is a continuation of, and claims priority to each of, U.S. patent application Ser. No. 17/065,247 (now U.S. Pat. No. 11,540,352), filed Oct. 7, 2020, and entitled "CLOSED LOOP CARRIER SENSE MULTIPLE ACCESS WITH MULTIUSER REQUEST TO SEND AND CLEAR TO SEND HANDSHAKING IN AN ADVANCED WIRELESS NETWORK," which is a continuation of U.S. patent application Ser. No. 16/138,132 (now U.S. Pat. No. 10,834,781), filed Sep. 21, 2018, and entitled "CLOSED LOOP CARRIER SENSE MULTIPLE ACCESS WITH MULTIUSER REQUEST TO SEND AND CLEAR TO SEND HANDSHAKING IN AN ADVANCED WIRELESS NETWORK," the entireties of which priority applications are hereby incorporated by reference herein.

TECHNICAL FIELD

The present application relates generally to the field of mobile communication and, more specifically, to implementing closed loop carrier sense multiple access (CSMA) and multiuser request to send (RTS) and clear to send (CTS) handshaking in a next generation wireless communications network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Unique challenges exist to provide levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 1 illustrates an example wireless communication system in accordance with various aspects and embodiments of the subject disclosure.

FIG. 2 illustrates another example wireless communication system in accordance with various aspects and embodiments of the subject disclosure.

FIG. 5 illustrates an example method for performing closed loop CSMA with multiuser RTS and CTS handshaking in accordance with various aspects and embodiments of the subject disclosure.

FIG. 6 illustrates an example method for performing closed loop CSMA with multiuser RTS and CTS handshaking in accordance with various aspects and embodiments of the subject disclosure.

FIG. 7 illustrates an example method for performing closed loop CSMA with multiuser RTS and CTS handshaking in accordance with various aspects and embodiments of the subject disclosure.

DETAILED DESCRIPTION

Figure 3:
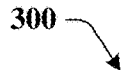
FIG. 3 illustrates an example block diagram showing a message sequence chart in accordance with various aspects and embodiments of the subject disclosure.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

Various embodiments disclosed herein provide for a closed loop carrier sense multiple access multiuser request to send and clear to send handshaking procedure to efficiently allocate licensed and unlicensed spectrum for a plurality of mobile devices and across different base stations and mobile network operators. A user equipment device can be connected to a base station device via a first frequency in licensed spectrum, and a second frequency in unlicensed spectrum. The air interface on the first frequency can then be used to coordinate physical and virtual carrier sensing on a second frequency among a plurality of user equipment devices. Moreover, carrier sensing results at a plurality of user equipment devices (UEs) on a second frequency in unlicensed spectrum can be reported to a base station device via the first frequency in licensed spectrum. Based on these reports, the base station device can schedule multiple user multiple input, multiple output (MU-MIMO) transmission to a plurality of UEs on a second frequency in unlicensed spectrum.

By coordinating the carrier sensing at a plurality of UEs and by reporting the outcomes of the carrier sensing procedure back to the base station, the base station can use this information to jointly optimize the transmissions to a plurality of UEs whereby this is not possible in current carrier sensing mechanisms that operate independently at each device. Said joint optimization of transmissions to multiple devices increases the spectral efficiency of the overall system as well as the perceived user throughput and latency via the air interface between a base station and a mobile station.

In various embodiments, a base station device can comprise a processor and a memory that stores executable instructions that, when executed by the processor facilitate performance of operations. The operations can comprise facilitating transmitting a request to send signal to a mobile device, wherein the request to send signal facilitates initiation of a first clear channel assessment of a channel at a defined time. The operations can also include performing a second clear channel assessment of the channel at the defined time. The operations can also include in response to a first result of the second clear channel assessment indicating that the channel is clear, transmitting a waveform signal on the second channel, wherein the waveform signal indicates the channel is reserved.

In various embodiments, a user equipment device can comprise a processor and a memory that stores executable instructions that, when executed by the processor facilitate performance of operations. The operations can comprise performing a clear channel assessment of a first channel at a first frequency, wherein the first frequency is part of a first frequency spectrum, and wherein performing the clear channel assessment is in response to receiving a request to send signal from a base station device. The operations can also comprise facilitating transmitting a control channel transmission comprising a result of the clear channel assessment to the base station device via a second channel at a second frequency, wherein the second frequency is part of a second frequency spectrum that is different from and does not overlap the first frequency spectrum. The operations can also comprise in response to the result of the clear channel assessment indicating that there is no activity on the first channel, transmitting a clear to send signal on the first channel, wherein the clear to send signal indicates that the channel is reserved for the base station device.

In another embodiment, a first base station device can comprise a processor and a memory that stores executable instructions that, when executed by the processor facilitate performance of operations. The operations can comprise receiving, from a first user equipment device, an indication that the first user equipment device received a signal at a first frequency, wherein the signal indicates that a second base station device has reserved the first frequency for a first transmission. The operations can also comprise determining a group of transmission parameters for a second transmission to a second user equipment device, wherein the second transmission will not interfere with the first transmission. The operations can also comprise transmitting the group of transmission parameters to the second user equipment device on a control channel.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IoT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

In an embodiment, network node 106 or UE 102 and UE 104 can perform clear channel assessments (CCA) on channels to avoid sending a transmission on a physical resource that already has activity on the channel. In an embodiment, the network node 106 can send a Request to Send trigger to the UE 104 and/or the UE 102 in order to coordinate the LBT process which comprises a clear channel assessment and then reporting the results of the clear channel assessment back to the network node 106. If the network node determines that there is no activity on the channel at both the transmitter and receiver side, the network node 106 can schedule a transmission on the channel.

Listen Before Talk (LBT) is a coexistence mechanism used by wireless technologies, such as 3G, 4G, 5G, Wi-Fi, and other advanced networks to access unlicensed shared spectrum, such as the ISM UNII (Unlicensed National Information Infrastructure) bands (5 GHz). A form of LBT is required by regulation in some countries and regions, such as Europe and Japan. In the US although LBT is not required by regulation, it is used by Wi-Fi and LTE License Assisted Access (LAA) for coexistence purposes. In an embodiment, in LAA, the data channel can use the unlicensed channel for improved throughput, but the control signaling can be performed using the licensed carriers for improved robustness and low latency since those resources are dedicated for the operator and not subject to coexistence requirements. However, the data channel, on which the LBT is being performed can be an unlicensed carrier that is typically used for offloading data transmissions from the licensed carriers due to the large available bandwidth.

As part of the LBT procedure the devices perform spectrum sensing also known as Clear Channel Assessment (CCA), where multiple time/frequency slots are measured with respect to a configured energy detection (ED) threshold. While LBT performed independently at a transmitting node can be used to avoid collisions of transmissions at a target receiver, the performance may suffer from so-called "hidden node problems" if the interfering transmitting nodes are outside the sensing range of the transmitting node. Due to the challenges of hidden nodes and associated latency incurred by LBT procedures on unlicensed carriers, it is beneficial to utilize the licensed (NR-L) and unlicensed (NR-U) carriers in LAA deployments jointly to perform LBT procedures. Various embodiments herein describe utilizing the licensed carrier to provide LBT configuration, feedback, and coordination in networks utilizing LAA.

In one or more embodiments, NR ("New Radio" e.g., 5G) may operate in sub 6 GHz or above 6 GHz spectrum, including licensed and unlicensed spectrum. Especially in higher frequency bands, the performance of LBT may be improved significantly with transmit and receive beamforming. 5G systems, especially for mmWave spectrum, will have a large number of antenna elements which could be used for analog, digital or hybrid beamforming. With Time Division Duplex (TDD) transmission, every transmit beam has a corresponding receive beam with identical characteristics. Using this property, a transceiver can sense during LBT if other users are active on some beams but not on other beams. This allows the transceiver to use the inactive beams for its transmissions, thus increasing channel reuse efficiency without causing interference.

In an embodiment, existing carrier sense multiple access CSMA schemes are performed but the LBT process is performed at each node independently Hence, it is challenging for a base station device to schedule two users simultaneously because traditionally the RTS/CTS handshaking procedure is performed between one transmitter and a single receiver. Various embodiments herein propose closed-loop CSMA with multi-user RTS/CTS handshaking to enable MU-MIMO transmissions between one base station device e.g., network node 106 and a plurality of mobile stations, e.g., UE 102 and 104 in unlicensed spectrum.

Turning now to FIG. 2, illustrates another example wireless communication system in accordance with various aspects and embodiments of the subject disclosure.

In an embodiment, base station device 204 can perform a CSMA process to establish communications in an unlicensed spectrum with one or more of mobile device 206, 208, and 210 in service area 202. The base station device can use the multiuser Request to Send and Clear to Send signals in order to establish the service.

In an embodiment, the base station device 204 can send an RTS signal to devices 206, 208, and 210, requesting that they perform a LBT procedure to detect energy on a specified unlicensed frequency. In an embodiment, the RTS can be sent via a downlink control information on a single Physical Downlink Control Channel (PDCCH). In this embodiment, the transmission can be encoded with a single Radio Network Temporary Identifier (RNTI) to each of the mobile devices 206, 208, and 210 so that any of them can decode the transmission. In other embodiments, separate PDCCH transmissions can be sent to each of mobile devices 206, 208, and 210 with separate RNTIs, so that each mobile device decodes their respective control information. The mobile devices can determine which frequency to perform the LBT in based on one or more characteristics of the waveform transmission, or based on information encoded in the transmission. It is to be appreciated that the PDDCH channels and waveform transmissions can be transmitted on a frequency band other than the frequency band being tested. As an example, the PDCCH and waveform transmission can be transmitted on a licensed frequency band that does not require LBT.

Each of the mobile devices 206, 208, and 210 can then perform a CCA on the designated unlicensed channel, performing an LBT and then reporting the results back to the base station device 204. Simultaneously, or concurrently, the base station device 204 can also perform a CCA on the designated unlicensed channel. The LBT procedure is performed at each of the devices as sometimes the frequency band being tested may have energy detected at different locations in the cell area 202, based on where the transmission is originating. For example, a transmitter near device 210 transmitting energy on the unlicensed frequency band (e.g., base station 214 or device 216) may be detected by mobile device 210, and not base station device 204.

In response to the base station device 204 determining that the unlicensed channel is empty, or otherwise unoccupied by another transmitter, the base station device 204 can emit a waveform transmission to reserve the channel. In an embodiment, said waveform does not carry any information and simple signals to other UEs that the channel is now busy. For example, UE 216 may receive said waveform. It detects its energy and thus decides to not transmit hence leaving the channel to base station 204. The waveform can also contain information that facilitates automatic gain control or time/frequency synchronization of a receiver of devices 206, 208, or 210 with base station 204. In yet other embodiments, the waveform can be used to facilitate advanced measurements e.g., for radio link monitoring (RLM), radio resource management (RRM), channel state information (CSI), or beam management (BM). In yet other embodiments, the waveform can be a signal that encodes information by means of a specified bit sequence or can carry information that can be used by receivers for coexistence (i.e., receivers of 802.11 can decode channel for purpose of coexisting with base station device 204).

In an embodiment, after the UEs 210, 206, and or 208 perform the CCA on the unlicensed channel, they can prepare respective control channel transmissions to be sent via the licensed channel on a licensed uplink control channel to base station device 204 informing the base station device 204 of the results of the CCA. In an embodiment, the control channel transmission from the mobile devices 206, 208, and 210 can also inform the base station device 204 about any results of measurements the UE performed based on the waveform transmitted by the base station device 204, including but not limited to, RLM, RRM, CSI, BM measurement reports and etc.

The UEs, 206, 208, and 210, if they determine that no energy is detected on the unlicensed channel, can then transmit a Clear to Send waveform on the unlicensed channel to inform both the base station device 204 that it can schedule a transmission on the unlicensed channel, but also can inform other devices (e.g., 216) operating in other cell areas (e.g., 212) or by other mobile network operators that there will be a transmission on the unlicensed channel shortly.

In an embodiment, the CTS waveform can be sent in a Time Division Multiplexing (TDM) manner, where a first signal is sent on a first Orthogonal Frequency Division Multiplexing (OFDM) symbol, and a second signal on a second OFDM signal. In other embodiments, the CTS waveform can be sent in a Frequency Division Multiplexing (FDM) manner, where a first signal is sent on a first group physical resource blocks (PRB), and a second signal is sent on a second group of PRB. FDM may also be based on subcarriers (REs) or bandwidth parts. In another embodiment, the CTS waveform can be sent in a Code Division Multiplexing (CDM) manner. In an embodiment, the CTS waveforms can convey information between mobile devices 210, 206, and 208 as well as with the base station 204. The CTS waveforms can be sent by either a signal like the waveform transmitted by the base station, or via a control channel.

In an embodiment, the base station device 204 uses the CTS waveforms received from device 206, 208, and 210 and any information conveyed by the CTS waveforms to determine transmission parameters for multi-user transmission to mobile devices 206, 208, and/or 210 based on information received from the mobile devices. The parameters can be transmitted to the mobile device on the unlicensed frequency or can be transmitted via a PDCCH in a licensed channel as an example of cross carrier scheduling.

In an embodiment, the mobile device 216 can receive either of the waveform transmitted by the base station device 204 reserving the unlicensed channel, or can receive the CTS waveform transmitted by the mobile device 210. Mobile device can transmit information about the CTS waveform to base station device 214 which can then use the information to schedule transmissions to devices 216 and 218. As an example, if device 216 detects the CTS waveform, and 218 detects no energy on the unlicensed channel, base station device 214 can then schedule a transmission to device 216 in such a way that the transmission does not interfere with the transmission being scheduled by base station device 204, while scheduling a transmission on the unlicensed channel to device 218.

In an embodiment, the device 216 can report receiving an RTS signal from another mobile device to base station 214. Base station device 214 can treat the RTS similar to a CTS. In an embodiment, the mobile device 216 can be configured to report CTS and/or RTS receptions to the base station device 214.

It is to be appreciated that in an embodiment, base station device 204 and 214 can belong to the same mobile network or can be operated by different mobile network operators, or can even correspond to different mobile access technologies (e.g., base station 204 is a 4G/5G device, while base station 214 can utilize a different access technology, e.g., 802.11) Using the CTS/RTS handshaking, can enable base stations and mobile devices on different networks to coexist using licensed and unlicensed frequencies/channels.

Turning now to FIG. 3, illustrated is an example block diagram showing a message sequence chart 300 in accordance with various aspects and embodiments of the subject disclosure. It is to be appreciated that while FIG. 3 depicts base station 204 (from FIG. 2) communicating with a single mobile device 210, in other embodiments, the base station 204 can be communicating with a plurality of mobile devices (e.g., device 206 and 208).

A base station 204 can first determine which mobile devices or mobile stations will participate in the multi-user handshaking procedure. Once it identifies mobile device 210, the base station device 204 can prepare control channel transmissions to each mobile station participating in the procedure. At 306, the control channel transmissions are sent to mobile device 210 on a first frequency. The first frequency can be in licensed spectrum and the corresponding communications links have been established to normal control channel establishment procedures.

In an embodiment, the base station device 204 can send the control channel transmission at 306 to a plurality of mobile devices using the same PDCCH, and each of the mobile devices can be configured with the same RNTI that scrambles cyclic redundancy check bits of a PDCCH. Hence, all UEs can successfully decode the same PDCCH transmitted at 306. In other embodiments, each of the mobile devices can be configured with separate RNTIs, and thus the downlink control information can be sent via separate PDCCHs. In yet another embodiment, a new signal/channel/waveform is used different from the existing PDCCH. For example, said new signal/channel/waveform may be designed to minimize the power consumption at the UE when receiving the new signal/channel/waveform. Said new signal/channel/waveform can be considered the RTS part of the multi-user handshaking procedure. Each mobile station participating in the procedure decodes the RTS like signal/channel/waveform which is transmitted on a first frequency in licensed spectrum.

According to the information conveyed by the RTS-like signal/channel/waveform, all mobile stations participating in the procedure perform a clear channel assessment (CCA) procedure on a second frequency in unlicensed spectrum (e.g., mobile device 210 at 310). The CCA procedure can be based on energy detection and can use LBT procedures. The base station 204 performs the CCA at 308 at the same time as the mobile device 210 performs the CCA at 310.

In response to performing the CCA procedure at 308, and determining that the air interface on the second frequency in unlicensed spectrum is idle, the base station 204 can transmit a waveform at 312 to reserve the channel. In one embodiment, said waveform does not carry any information and simply signals to other UEs (e.g., mobile device 210) that the channel is now busy.

Mobile device 210 can receive the waveform 312, and in the case of the waveform carrying information, the mobile device 210 can use the waveform for automatic gain control (AGC) or time and/or frequency synchronization of its own receiver with the base station. In yet another embodiment, mobile device 210 may use said waveform to perform advanced measurements, e.g., for the purpose of radio link monitoring (RLM), radio resource management (RRM), channel state information (CSI) acquisition, or beam management (BM).

In an embodiment, the waveform 312 can be a signal that does encode information by means of a specified bit sequence. In another embodiment, said waveform can be a channel carrying a payload. The channel can convey information that can be used by receivers for the purpose of coexistence. For example, receivers of another radio access technology (RAT) such as those based on the IEEE 802.11 standard, can decode said channel for the purpose of coexistence with the transmitter sending the channel.

After performing the CCA procedure on a second frequency in unlicensed spectrum, mobile device 210 can report the results of the CCA and the measurements performed on the waveform at 314 back to the base station device 204. The mobile device 210 can prepare a control channel transmission to base station 204.

At 316, in order to allow for collision avoidance by means of virtual carrier sensing, mobile device 210 send a CTS message on the second frequency in unlicensed spectrum. For example, another mobile device on a different network, or further away from the base station device (e.g., mobile device 216) may not be able to receive the waveform sent by base station 204 at 312. Hence, mobile device 216 may decide to commence a transmission on its own wrongfully assuming that the channel is idle. Said transmission would then create interference with those from base station 204. Consequently, due to said interference, mobile device 210 may not be able to receive transmissions from base station device 204. The CTS signal transmitted by mobile device 210 indicates to mobile device 216 that the channel is busy, thereby avoiding the collisions.

Due to the multi-user nature of the proposed RTS/CTS handshaking procedure, in one embodiment, mobile device 210 send the CTS messages in at 316 in a time-division multiplexing (TDM) manner. For example, 316 may be sent on a first orthogonal frequency-division multiplexing (OFDM) symbol from device 210 and on another OFDM symbol from another mobile device. In another embodiment, the waveform 316 can also be received by mobile device 216 which is part of another network. In another embodiment, mobile device 210, and another mobile device, may send the CTS messages in a frequency-division multiplexing (FDM) manner.

In yet another embodiment, mobile device 210 can send the CTS messages in a code-division multiplexing (CDM) manner. For example, a first message may be sent using a first sequence of pseudo-random symbols and a second message sent using a second sequence of pseudo-random symbols. In other words, CTS messages may be transmitted by using the same pseudo-random sequence generator, however, a first message is initializing said pseudo-random sequence generator using a first value and a second message using a second value. In an embodiment, the CTS message at 316 can be transmitted by a waveform signal, or can be transmitted via a control channel.

Finally, the procedure concludes at 318 when the base station device 204 determines transmission parameters for a multi-user transmission to mobile device 210 (and devices 206 and 208) based on the information received from the mobile stations at the base stations based on the embodiments herein. Said transmission parameters are informed to the mobile stations mobile device 206, 208, and 210 via a control channel transmission, which the base station device 204 prepares at 318. Said control channel transmissions convey the necessary downlink control information (DCI) to the mobile stations to receive a multi-user data transmission. Said DCI schedules data transmissions to the mobile stations on the second frequency in unlicensed spectrum. Hence, the embodiments herein enable MU-MIMO in unlicensed spectrum.

Figure 4:
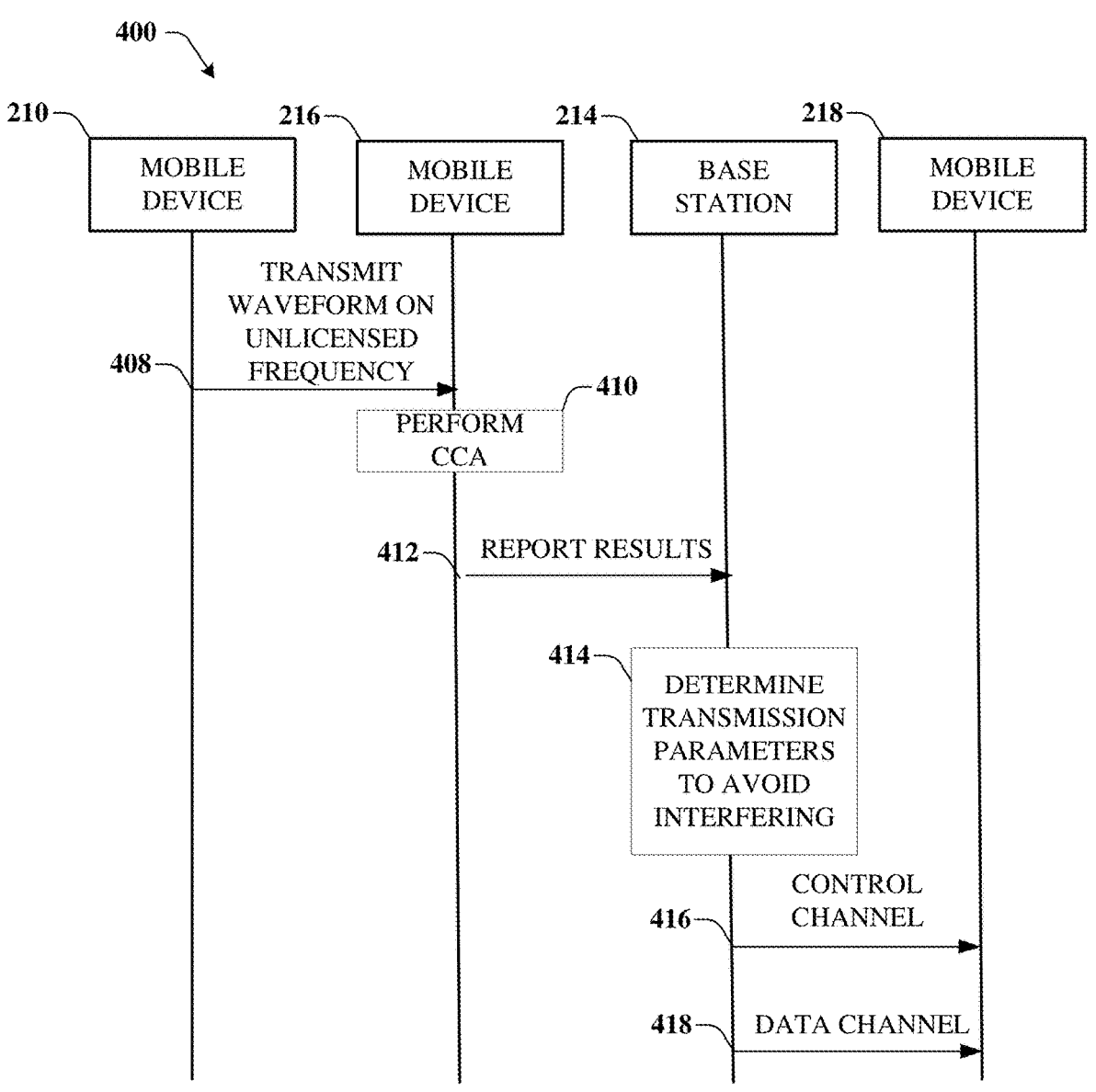
FIG. 4 illustrates an example block diagram showing a message sequence chart in accordance with various aspects and embodiments of the subject disclosure.

Turning now to FIG. 4, illustrated an example block diagram showing a message sequence chart in accordance with various aspects and embodiments of the subject disclosure.

In an embodiment, base station 214 may not receive the CTS message 408 sent by mobile device 210 that the mobile device broadcasts, and instead is received by mobile device 216. If base station 214 transmitted to mobile station 216, its transmission would collide with that of base station 204. Base station 214 thus configures mobile station 216 to report received CTS messages in a control channel transmission 412. In an embodiment, the mobile device 216 can detect the CTS message in a CCA performed at 410. In other embodiments, it receives the CTS message 408 without performing the CCA 410. A first mobile station 216 that received a CTS message 408 reports said CTS message in a control channel transmission 412 to base station 214. A second mobile station (e.g., mobile device 218) that was also configured by base station 214 to report CTS messages via a control channel transmission does not receive the CTS messages 408 and hence does not report a CTS message in a control channel transmission. Alternatively, device 218 may send a control channel transmission to report that no CTS message was received.

Hence, the base station 214 can conclude that a transmission to mobile station 216 would result in a collision with another transmission whereas a transmission to mobile station 218 would not result in a collision since no CTS message was reported by mobile station 323. Consequently, in at 414, base station 214 determines transmission parameters for a non-interfering transmission to mobile station 218. In 416 it transmits a control channel transmission scheduling a data transmission according to the determined transmission parameters. Next, the base station 216 prepares the corresponding data channel transmission and sends it to mobile station 218 in 418.

In one embodiment, base station 204 and 214 belong to the same mobile network operator. In another embodiment, base station 204 and 214 belong to different mobile network operators. In yet another embodiment, the control channel transmission 412 is sent on the second frequency in unlicensed spectrum. In still another embodiment, the control channel transmission 412 is sent on the third frequency in licensed spectrum.

In yet another embodiment, mobile station 216, instead of reporting a CTS message in 412, may report an RTS message from another mobile station to base station 214. For example, a mobile station may send an RTS message/waveform/signal before an uplink (UL) transmission to a base station or, alternatively, before a sidelink (SL) transmission to another mobile station device. If mobile station 216 reports an RTS message and mobile station 218 was also configured to report an RTS message but did not report one, base station 214 can conclude that it can schedule mobile station 218 as it did not receive an RTS message whereas it cannot schedule mobile station 216 as this would result in a collision with the transmission by the mobile station that sent the RTS.

FIGS. 5-7 illustrates a process in connection with the aforementioned systems. The processes in FIGS. 5-7 can be implemented for example by the systems and methods described in FIGS. 1-4 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 5 illustrates an example method 500 for performing closed loop CSMA with multiuser RTS and CTS handshaking in accordance with various aspects and embodiments of the subject disclosure.

Method 500 can begin at 502 where the method includes facilitating transmitting a request to send signal to a mobile device, wherein the request to send signal facilitates initiation of a first clear channel assessment of a channel at a defined time.

At 504, the method includes performing a second clear channel assessment of the channel at the defined time.

At 506, the method includes in response to a first result of the second clear channel assessment indicating that the channel is clear, transmitting a waveform signal on the channel, wherein the waveform signal indicates the channel is reserved.

FIG. 6 illustrates an example method 600 for performing closed loop CSMA with multiuser RTS and CTS handshaking in accordance with various aspects and embodiments of the subject disclosure.

Method 600 can begin at 602 where the method includes performing a clear channel assessment of a first channel at a first frequency, wherein the first frequency is part of a first frequency spectrum, and wherein the performing the clear channel assessment is in response to receiving a request to send signal from a base station device.

At 604, the method includes facilitating transmitting a control channel transmission comprising a result of the clear channel assessment to the base station device via a second channel at a second frequency, wherein the second frequency is part of a second frequency spectrum that is different from and does not overlap the first frequency spectrum.

At 606, the method includes in response to the result of the clear channel assessment indicating that there is no activity on the first channel, transmitting a clear to send signal on the first channel, wherein the clear to send signal indicates that the channel is reserved for the base station device.

FIG. 7 illustrates an example method 700 for performing closed loop CSMA with multiuser RTS and CTS handshaking in accordance with various aspects and embodiments of the subject disclosure.

Method 700 can begin at 702 where the method includes receiving, from a first user equipment device, an indication that the first user equipment device received a signal at a first frequency, wherein the signal indicates that a second base station device has reserved the first frequency for a first transmission.

At 704, the method includes determining a group of transmission parameters for a second transmission to a second user equipment device, wherein the second transmission will not interfere with the first transmission.

At 706, the method includes transmitting the group of transmission parameters to the second user equipment device on a control channel.

Figure 8:
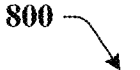
FIG. 8 illustrates an example block diagram of a non-limiting embodiment of a mobile network platform in accordance with various aspects described herein.

FIG. 8 presents an example embodiment 800 of a mobile network platform 810 that can implement and exploit one or more aspects of the disclosed subject matter described herein. Generally, wireless network platform 810 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 810 can be included in telecommunications carrier networks, and can be considered carrier-side components as discussed elsewhere herein. Mobile network platform 810 includes CS gateway node(s) 812 which can interface CS traffic received from legacy networks like telephony network(s) 840 (e.g., public switched telephone network (PSTN), or public land mobile network (PLMN)) or a signaling system #7 (SS7) network 860. Circuit switched gateway node(s) 812 can authorize and authenticate traffic (e.g., voice) arising from such networks. Additionally, CS gateway node(s) 812 can access mobility, or roaming, data generated through SS7 network

860; for instance, mobility data stored in a visited location register (VLR), which can reside in memory 830. Moreover, CS gateway node(s) 812 interfaces CS-based traffic and signaling and PS gateway node(s) 818. As an example, in a 3GPP UMTS network, CS gateway node(s) 812 can be realized at least in part in gateway GPRS support node(s) (GGSN). It should be appreciated that functionality and specific operation of CS gateway node(s) 812, PS gateway node(s) 818, and serving node(s) 816, is provided and dictated by radio technology(ies) utilized by mobile network platform 810 for telecommunication. Mobile network platform 810 can also include the MMEs, HSS/PCRFs, SGWs, and PGWs disclosed herein.

In addition to receiving and processing CS-switched traffic and signaling, PS gateway node(s) 818 can authorize and authenticate PS-based data sessions with served mobile devices. Data sessions can include traffic, or content(s), exchanged with networks external to the wireless network platform 810, like wide area network(s) (WANs) 850, enterprise network(s) 870, and service network(s) 880, which can be embodied in local area network(s) (LANs), can also be interfaced with mobile network platform 810 through PS gateway node(s) 818. It is to be noted that WANs 850 and enterprise network(s) 870 can embody, at least in part, a service network(s) like IP multimedia subsystem (IMS). Based on radio technology layer(s) available in technology resource(s) 817, packet-switched gateway node(s) 818 can generate packet data protocol contexts when a data session is established; other data structures that facilitate routing of packetized data also can be generated. To that end, in an aspect, PS gateway node(s) 818 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 800, wireless network platform 810 also includes serving node(s) 816 that, based upon available radio technology layer(s) within technology resource(s) 817, convey the various packetized flows of data streams received through PS gateway node(s) 818. It is to be noted that for technology resource(s) 817 that rely primarily on CS communication, server node(s) can deliver traffic without reliance on PS gateway node(s) 818; for example, server node(s) can embody at least in part a mobile switching center. As an example, in a 3GPP UMTS network, serving node(s) 816 can be embodied in serving GPRS support node(s) (SGSN).

For radio technologies that exploit packetized communication, server(s) 814 in wireless network platform 810 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 810. Data streams (e.g., content(s) that are part of a voice call or data session) can be conveyed to PS gateway node(s) 818 for authorization/authentication and initiation of a data session, and to serving node(s) 816 for communication thereafter. In addition to application server, server(s) 814 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 810 to ensure network's operation and data integrity in addition to authorization and authentication procedures that CS gateway node(s) 812 and PS gateway node(s) 818 can enact. Moreover, provisioning server(s) can provision services from external network(s) like networks operated by a disparate service provider; for instance, WAN 850 or Global Positioning System (GPS) network(s) (not shown). Provisioning server(s) can also provision coverage through networks associated to wireless network platform 810 (e.g., deployed and operated by the same service provider), such as femto-cell network(s) (not shown) that enhance wireless service coverage within indoor confined spaces and offload RAN resources in order to enhance subscriber service experience within a home or business environment by way of UE 875.

It is to be noted that server(s) 814 can include one or more processors configured to confer at least in part the functionality of macro network platform 810. To that end, the one or more processor can execute code instructions stored in memory 830, for example. It should be appreciated that server(s) 814 can include a content manager 815, which operates in substantially the same manner as described hereinbefore.

In example embodiment 800, memory 830 can store information related to operation of wireless network platform 810. Other operational information can include provisioning information of mobile devices served through wireless platform network 810, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 830 can also store information from at least one of telephony network(s) 840, WAN 850, enterprise network(s) 870, or SS7 network 860. In an aspect, memory 830 can be, for example, accessed as part of a data store component or as a remotely connected memory store.

Figure 9:
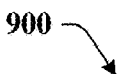
FIG. 9 illustrates an example block diagram of an example user equipment that can be a mobile handset operable to provide a format indicator in accordance with various aspects and embodiments of the subject disclosure.

Referring now to FIG. 9, illustrated is a schematic block diagram of an example end-user device such as a user equipment) that can be a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the various embodiments also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and trouble-shooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or tele-phony voice data, and for inputting voice signals for tele-phone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video compo-nent 930 can facilitate the generation, editing and sharing of video quotes. A location tracking component 932 facilitates geographically locating the handset 900. As described here-inabove, this can occur when the user initiates the feedback signal automatically or manually. A user input component 934 facilitates the user initiating the quality feedback signal. The user input component 934 can also facilitate the gen-eration, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger compo-nent 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia con-tent, for example, music.

The handset 900, as indicated above related to the com-munications component 810, includes an indoor network radio transceiver 913 (e.g., Wi-Fi transceiver). This function supports the indoor radio link, such as IEEE 802.11, for the dual-mode GSM handset 900. The handset 900 can accom-modate at least satellite radio services through a handset that can combine wireless voice and digital radio chipsets into a single handheld device.

Figure 10:
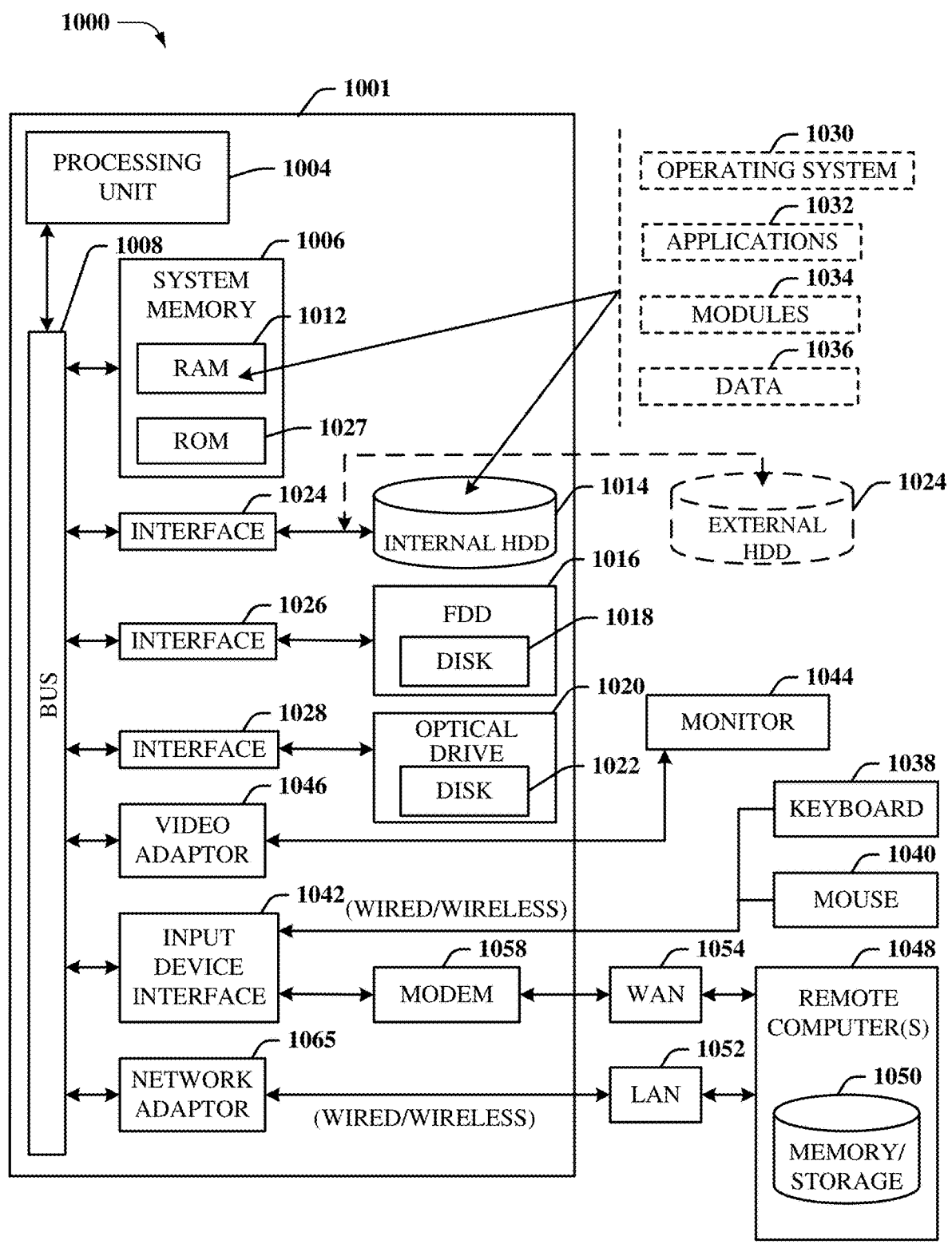
FIG. 10 illustrates an example block diagram of a computer that can be operable to execute processes and methods in accordance with various aspects and embodiments of the subject disclosure.

Referring now to FIG. 10, there is illustrated a block diagram of a computer 1000 operable to execute the func-tions and operations performed in the described example embodiments. For example, a network node (e.g., network node 214, 204 etc.) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establish-ment of a transaction between an entity and a third party. While the description above is in the general context of computer-executable instructions that can run on one or more computers, those skilled in the art will recognize that the various embodiments also can be implemented in com-bination with other program modules and/or as a combina-tion of hardware and software.

Generally, program modules include routines, programs, components, data structures, etc., that perform particular tasks or implement particular abstract data types. Moreover, those skilled in the art will appreciate that the various methods can be practiced with other computer system con-figurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limita-tion, computer-readable storage media can be implemented in connection with any method or technology for storage of information such as computer-readable instructions, pro-gram modules, structured data, or unstructured data. Com-puter-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable stor-age media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or trans-port media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes readonly memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprisewide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk;

magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," "station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations.

Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A device, comprising:

a processing system including a processor; and a memory that stores executable instructions that, when executed by the processing system, facilitate performance of operations, the operations comprising:

determining a group of user equipment for participation in a multi-user handshaking communication process comprising receiving and transmitting control channel transmission data to perform a clear channel assessment in unlicensed spectrum;

generating the control channel transmission data for a user equipment in the group of user equipment; and transmitting, using a first frequency in the unlicensed spectrum, the control channel transmission data to the user equipment of the group of user equipment.

2. The device of claim 1, wherein the user equipment is first user equipment, and wherein the first frequency in the unlicensed spectrum comprises a physical downlink control channel and the first user equipment and a second user equipment are configured to encode cyclic redundancy check bits of the physical downlink control channel using a radio network temporary identifier value.

3. The device of claim 1, wherein the user equipment is first user equipment, wherein the first frequency in the unlicensed spectrum comprises a first physical downlink control channel and a second physical downlink control channel, and the first user equipment is configured to encode first cyclic redundancy check bits of the first physical downlink control channel using a first radio network temporary identifier value, and a second user equipment is configured to encode second cyclic redundancy check bits of the second physical downlink control channel using a second radio network temporary identifier value.

4. The device of claim 1, wherein the operations further comprise initiating a clear channel assessment process using a second frequency in the unlicensed spectrum.

5. The device of claim 4, wherein the clear channel assessment process is a first clear channel assessment process, and wherein the transmitting of the control channel transmission data enables the group of user equipment to initiate a second clear channel assessment process using the second frequency, to generate clear channel assessment data based on the second clear channel assessment process, and transmit the clear channel assessment data to the device using the first frequency.

6. The device of claim 5, wherein the operations further comprise, based on a result of the first clear channel assessment process indicating that the second frequency is in an idle state and the clear channel assessment data indicating that the second frequency is in the idle state, transmitting a waveform that reserves the second frequency.

7. The device of claim 6, wherein the operations further comprise, based on the second frequency being in the idle state, transmitting clear to send data using the second frequency, and wherein the clear to send data is sent using a orthogonal frequency-division multiplexing symbol.

8. The device of claim 6, wherein the operations further comprise, based on the second frequency being in the idle state, transmitting clear to send data using the second frequency, and wherein the clear to send data is sent using a sequence of pseudo-random symbols.

9. A method, comprising:

facilitating, by a device comprising a processor, receiving clear channel assessment data from a group of user equipment regarding a frequency in an unlicensed spectrum;

initiating, by the device, a clear channel assessment process on the frequency;

based on the clear channel assessment data and a result of the clear channel assessment process, determining, by the device, that an air interface associated with the frequency is in an idle state; and based on the air interface being in the idle state, facilitating, by the device, transmitting a waveform on the frequency to the group of user equipment.

10. The method of claim 9, wherein, in a case where the waveform is not carrying data, the group of user equipment is to identify the frequency as being in an active state.

11. The method of claim 9, wherein, in a case where the waveform is carrying data representing a defined bit sequence, the group of user equipment, based on the defined bit sequence, performs an automatic gain control, performs a time synchronization of a receiver associated with a user equipment of the group of user equipment in communication with the device, and performs a frequency synchronization of the receiver associated with the user equipment in communication with the device.

12. The method of claim 9, further comprising:

after the transmitting of the waveform, facilitating, by the device, receiving, from the group of user equipment, clear to send data on the frequency.

13. The method of claim 12, wherein the receiving of the clear to send data comprises receiving the clear to send data using an orthogonal frequency-division multiplexing symbol.

14. The method of claim 12, wherein the receiving of the clear to send data comprises receiving the clear to send data using a sequence of pseudo-random symbols generated by a pseudo-random sequence generator using a value that is shared among the group of user equipment.

15. The method of claim 12, wherein the receiving of the clear to send data comprises receiving the clear to send data using a first sequence of pseudo-random symbols generated by a first pseudo-random sequence generator associated with a first user equipment of the group of user equipment and a second sequence of pseudo-random symbols generated by a second pseudo-random sequence generator associated with a second user equipment of the group of user equipment.

16. The method of claim 9, wherein the group of user equipment comprises a first user equipment and a second user equipment, and wherein, responsive to the transmitting of the waveform, the first user equipment is to transmit clear to send data on the frequency to the second user equipment and the device is to receive the clear to send data from the first user equipment on the frequency.

17. A non-transitory machine-readable medium, comprising executable instructions that, when executed by a processor, facilitate performance of operations, comprising:

receiving clear channel assessment data from a group of user equipment associated with a frequency in an unlicensed spectrum;

initiating a clear channel assessment process that uses the frequency;

based on the clear channel assessment data and a result of the clear channel assessment process, determining that an air interface associated with the frequency is in an idle state; and based on the air interface being determined to be in the idle state, transmitting, to the group of user equipment, a waveform that uses the frequency.

18. The non-transitory machine-readable medium of claim 17, wherein, as a result of the waveform carrying data representing a defined bit sequence, the group of user equipment is configured to, based on the defined bit sequence, perform an automatic gain control, perform a time synchronization of a receiver associated with a user equipment of the group of user equipment in communication with the processor, and perform a frequency synchronization of the receiver associated with the user equipment of the group of user equipment in communication with the processor.

19. The non-transitory machine-readable medium of claim 17, wherein the group of user equipment comprises a first user equipment and a second user equipment, and wherein, as a result of the transmitting of the waveform, the first user equipment is configured to transmit clear to send data to the second user equipment and the processor using the frequency.

20. The non-transitory machine-readable medium of claim 17, wherein the processor receives, from the group of user equipment, as a result of the transmitting of the waveform, clear to send data using the frequency, wherein the clear to send data is decodable by the processor using a first sequence of pseudo-random symbols generated by a first pseudo-random sequence generator associated with a first user equipment of the group of user equipment and a second sequence of pseudo-random symbols generated by a second pseudo-random sequence generator associated with a second user equipment of the group of user equipment.

* * * * *